March 28, 1961 H. E. MESCHER 2,977,107
HEAT TREATING FURNACE
Filed Oct. 8, 1957 12 Sheets-Sheet 1

INVENTOR.
Harold E. Mescher
BY
Paul B. Hunter
Attorney

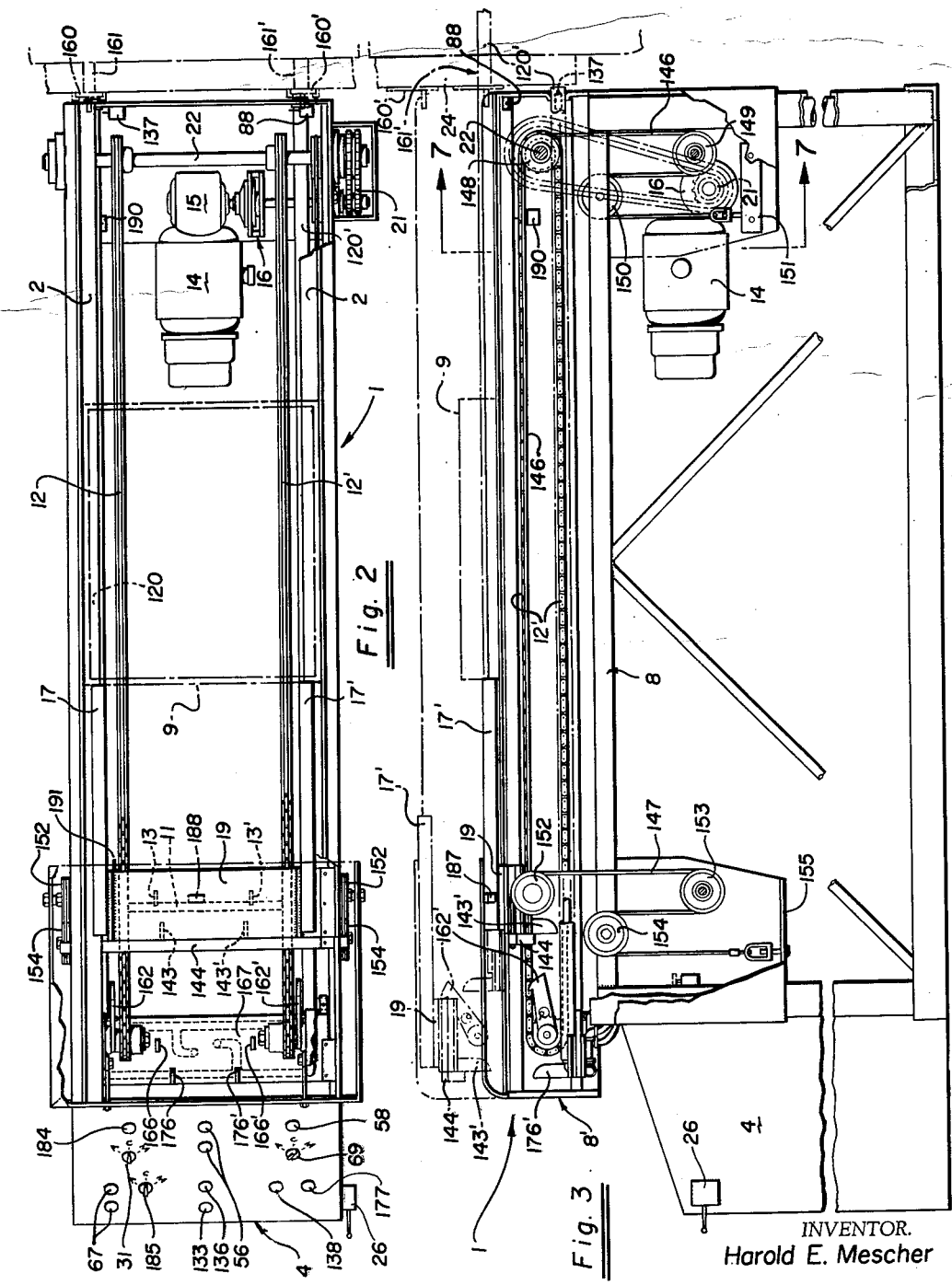

INVENTOR.
Harold E. Mescher

INVENTOR.
Harold E. Mescher
BY Paul B. Hunter
Attorney

March 28, 1961 H. E. MESCHER 2,977,107
HEAT TREATING FURNACE
Filed Oct. 8, 1957 12 Sheets-Sheet 5

INVENTOR.
Harold E. Mescher
BY
Paul B. Hunter
Attorney

March 28, 1961 H. E. MESCHER 2,977,107
HEAT TREATING FURNACE
Filed Oct. 8, 1957 12 Sheets-Sheet 6
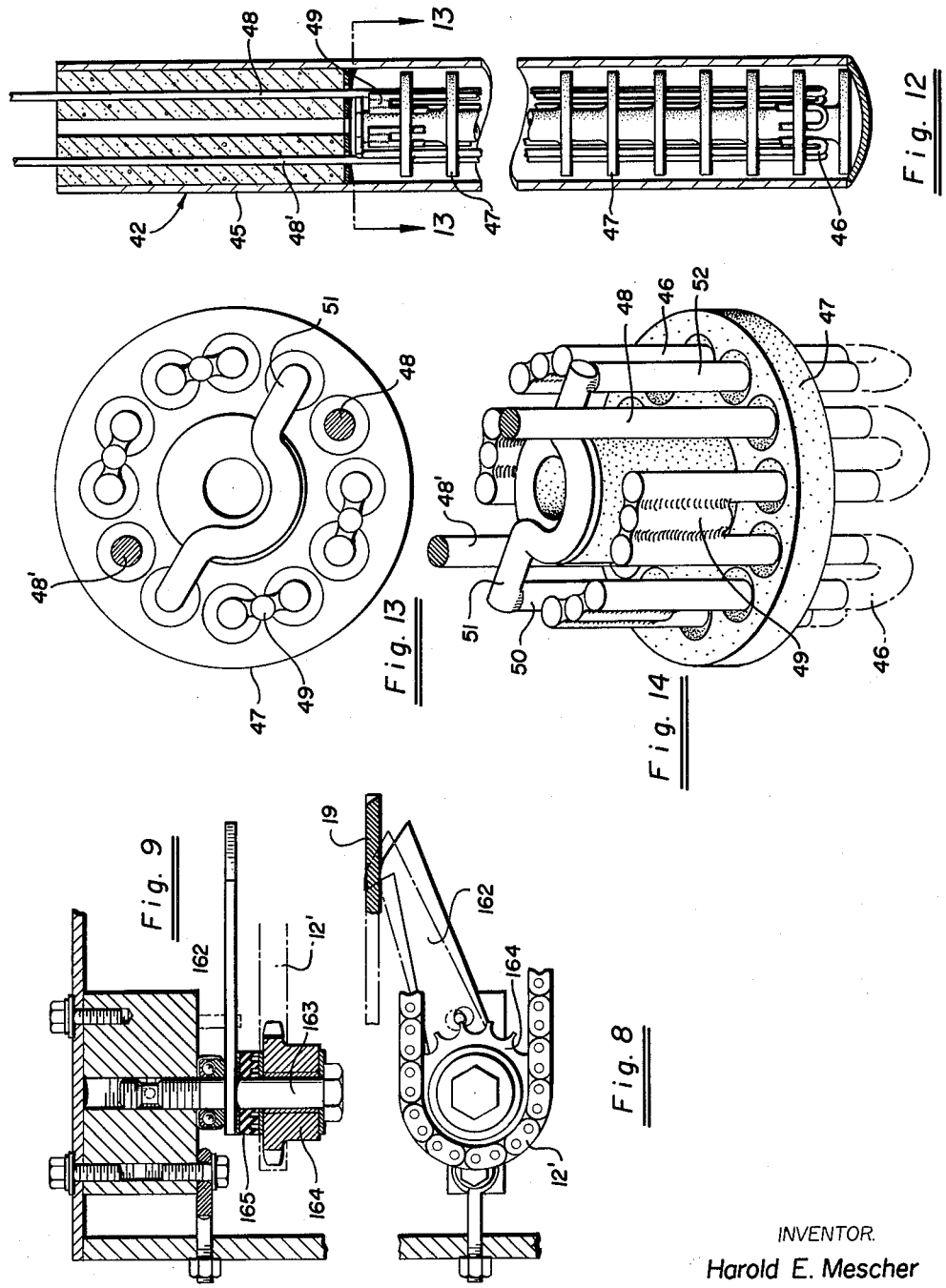
INVENTOR.
Harold E. Mescher
BY
Attorney

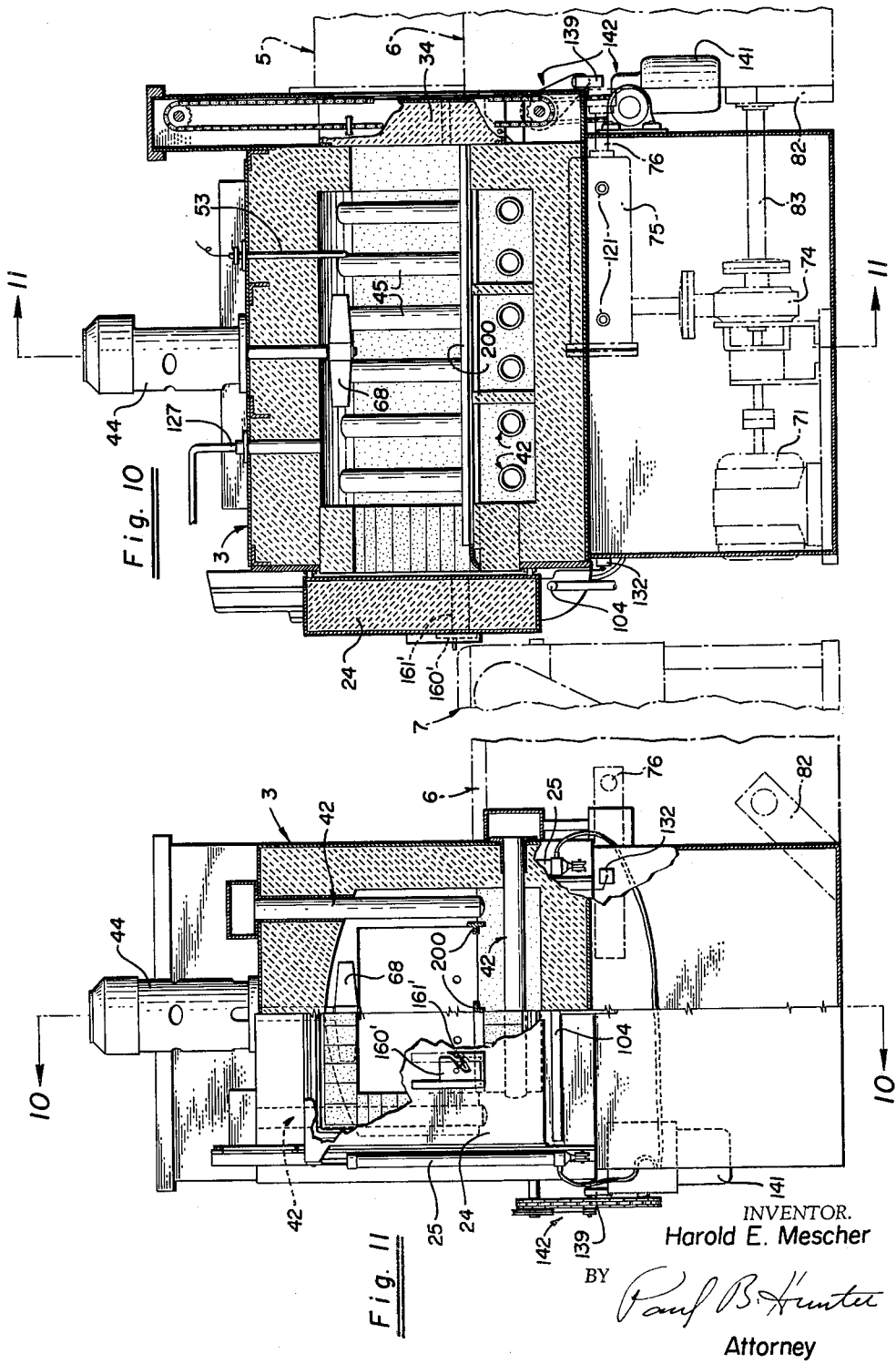

March 28, 1961 H. E. MESCHER 2,977,107
HEAT TREATING FURNACE
Filed Oct. 8, 1957 12 Sheets-Sheet 8
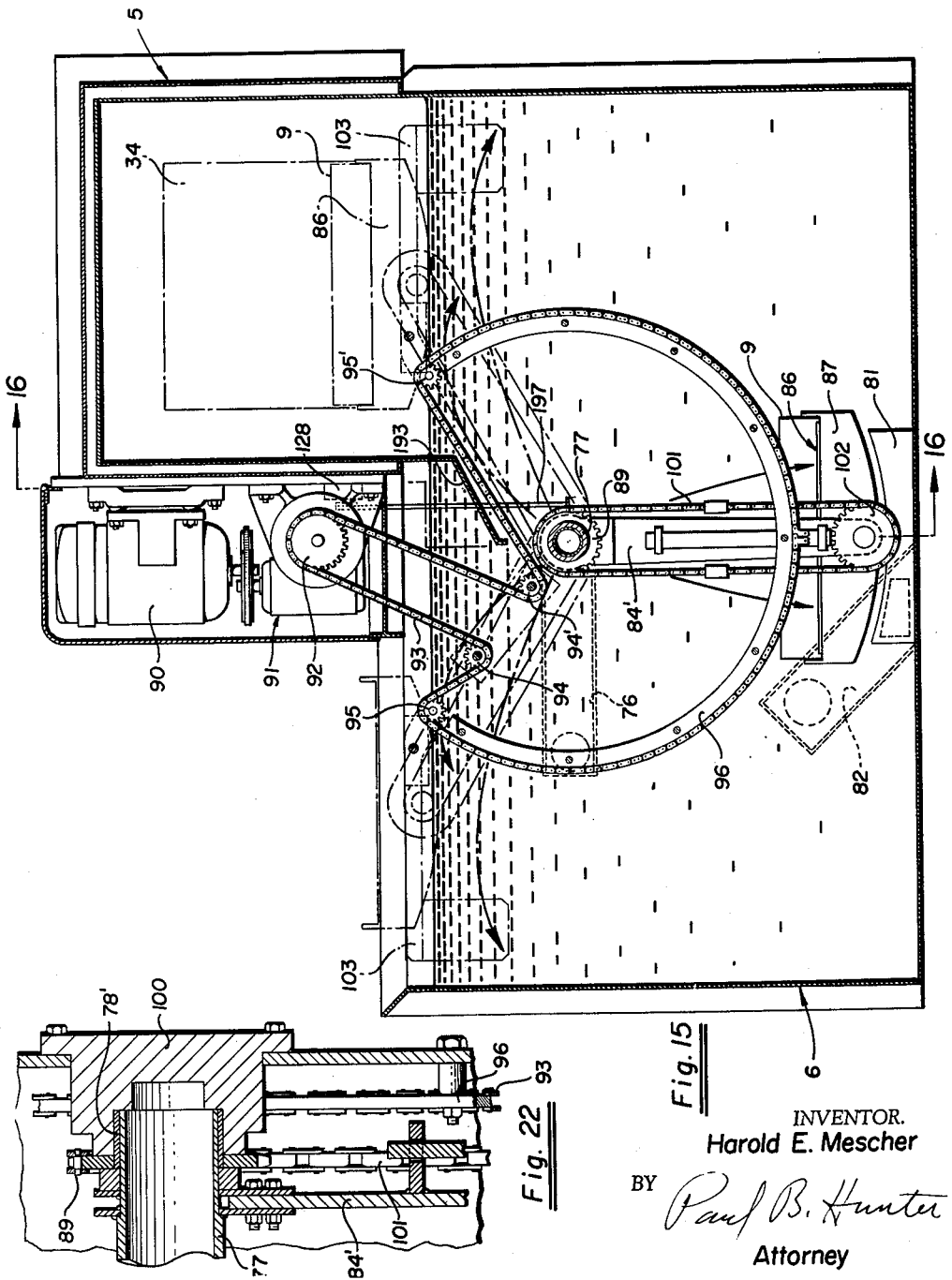
INVENTOR.
Harold E. Mescher
BY
Paul B. Hunter
Attorney

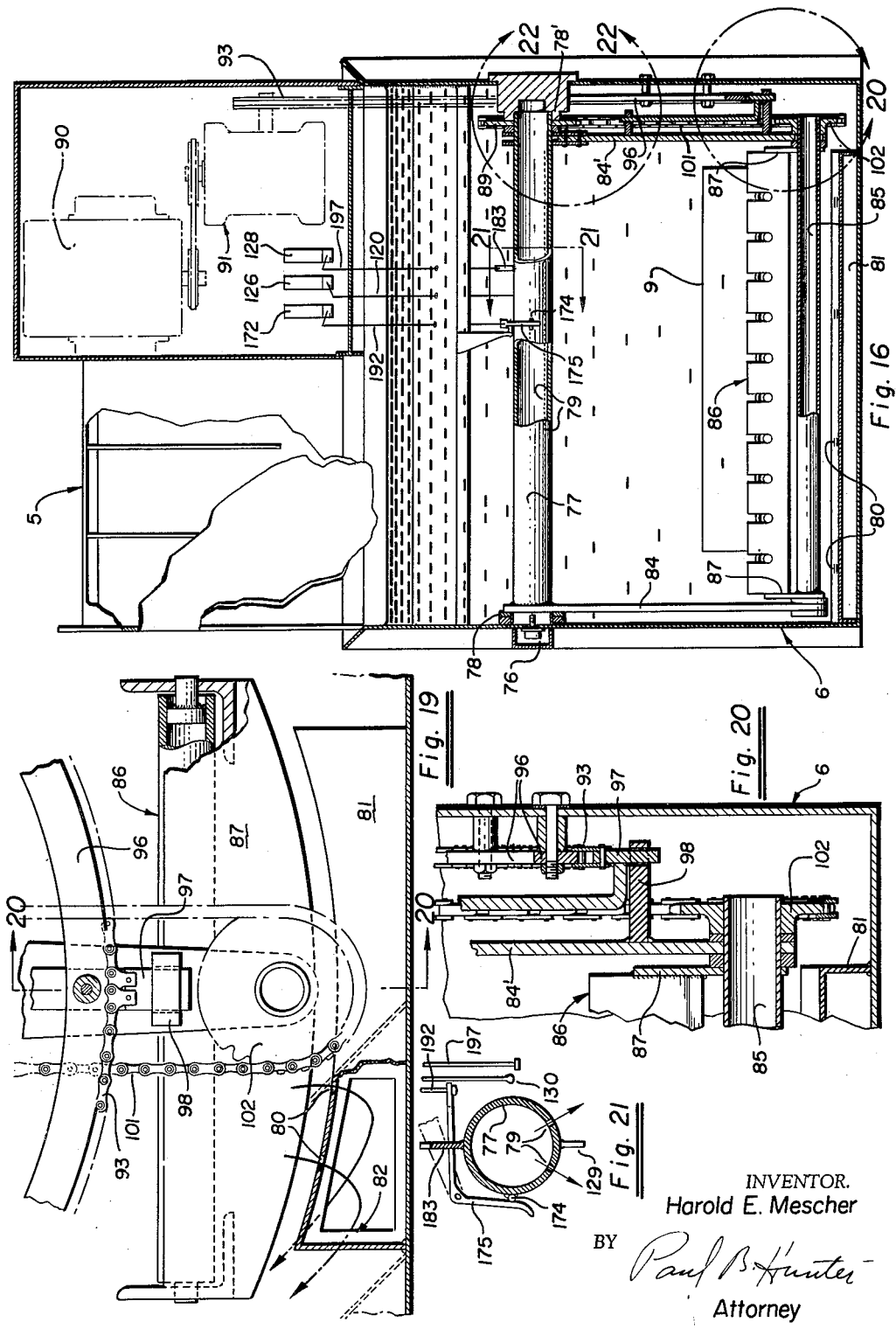

March 28, 1961 H. E. MESCHER 2,977,107
HEAT TREATING FURNACE
Filed Oct. 8, 1957 12 Sheets-Sheet 10
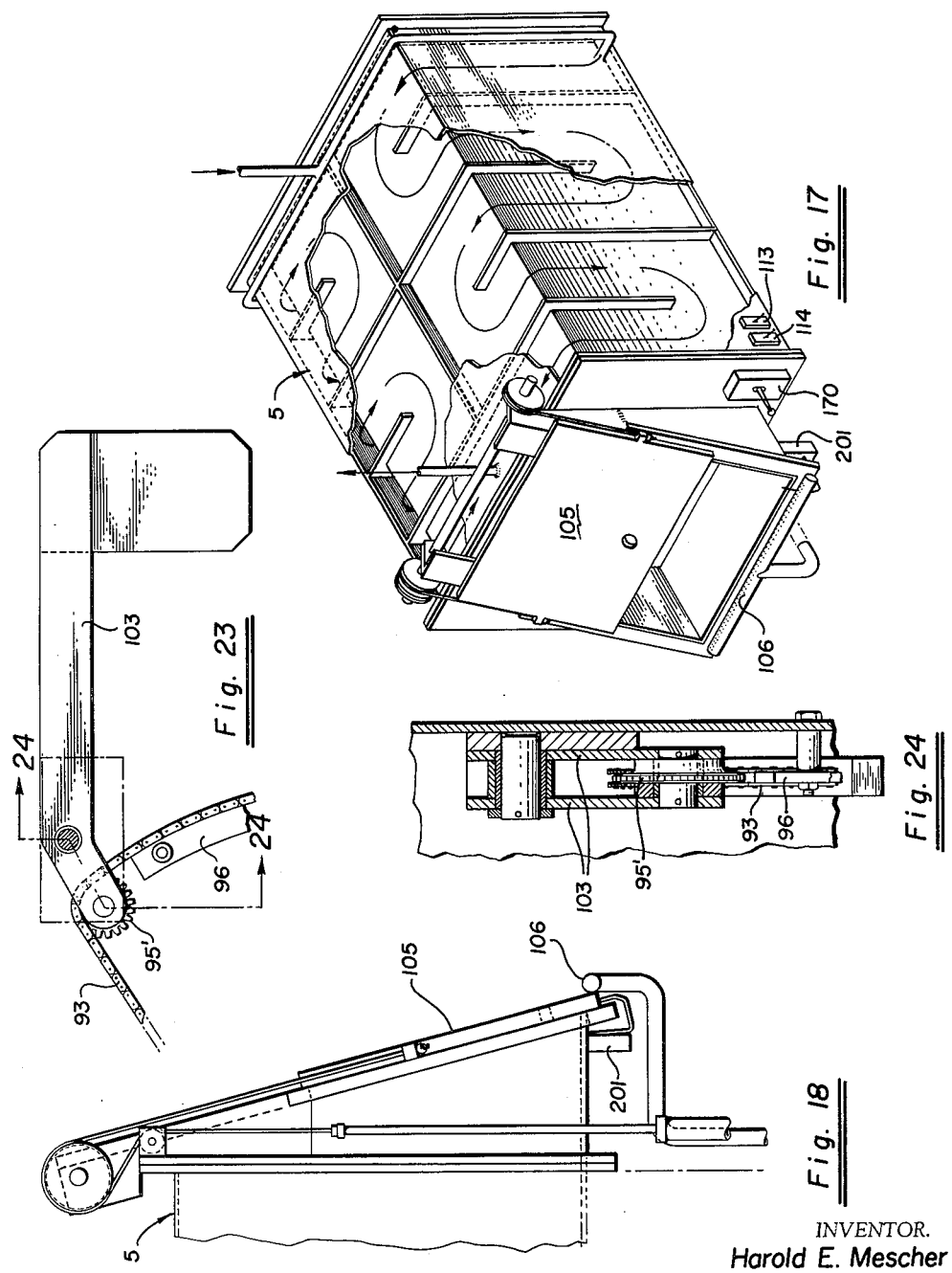
INVENTOR.
Harold E. Mescher
BY
Paul B. Hunter
Attorney INVENTOR.
Harold E. Mescher March 28, 1961 H. E. MESCHER 2,977,107
HEAT TREATING FURNACE
Filed Oct. 8, 1957 12 Sheets-Sheet 12

INVENTOR.
Harold E. Mescher
BY
Paul B. Hunter
Attorney

United States Patent Office 2,977,107
Patented Mar. 28, 1961

2,977,107

HEAT TREATING FURNACE

Harold E. Mescher, Rivera, Calif., assignor to Pacific Scientific Company, San Francisco, Calif., a corporation of California Filed Oct. 8, 1957, Ser. No. 688,954

12 Claims. (Cl. 266—4)

This invention relates, generally, to furnaces, and the invention has reference more particularly to a novel, heat-treating furnace especially suitable for hardening, carbo-nitriding, or carburizing, metal parts.

Heat-treating furnaces, as heretofore constructed, generally have not been entirely satisfactory, because such furnaces are often difficult to load, having no provision or inadequate provision for moving the work load through the furnaces. Ofttimes, it is necessary for the operator to move the work load manually into the heat chamber, which is more or less hazardous and to perform the quenching operation manually. Such furnaces, ofttimes, have not been properly controlled as to heat temperature or heat period, bearing in mind that the heat period will vary according to the work load and the nature of the load. Also, such furnaces ofttimes have produce a non-uniform product, because of inadequate quenching or quenching which required too much time to accomplish. Furthermore, such furnaces very often were hazardous because of the presence of outside atmosphere in the furnaces at the time of quench.

The principal object of the present invention is to provide a novel heat-treating furnace that is capable of high uniform production on an automatic basis, thereby substantially eliminating injury to the furnace operator in use and also preventing human errors obtaining in furnaces depending on manual operation, which furnace can be easily operated for handling the work, and for producting fast, even heat and uniform temperature distribution and control of the work.

Another object of the present invention is to provide a heat-treating furnace of the above character, having a novel, automatic loader controlled from an operator's console conveniently and safely located, the said automatic loader serving to push the load into the furnace and outward thereof in desired sequence without the operator exposing himself to the furnace heat.

A feature of the present invention is to provide a novel furnace of the above character, providing for fast, uniform heating of the work load and providing maximum heat transference to the load, the said furnace having novel heating elements accurately spaced on each side of the work as well as under the same, the load within the heating chamber being handled entirely automatically and the time of heating being dependent on the temperature conditions of the work itself.

Another feature of the present invention is to provide a novel furnace of the above character, having a water-jacketed cooling chamber connecting with the heating chamber through an intermediate door that is automatically opened to effect movement of the work load into the cooling chamber immediately upon the completion of the heating cycle, the cooling chamber being of such size to provide the maximum heat transfer from the load to the cooling medium with controlled gas atmosphere quenching, and said cooling chamber being constructed and arranged to substantially eliminate the possibility of cold atmosphere detonation therewithin due to the exclusion of outside air therefrom in use.

A further feature of the present invention is to provide a novel furnace of the above character having its cooling chamber provided with a flapper-type rear door, so that, in case an explosion should occur, such door will easily release internal pressures and immediately close thereafter, providing maximum safety, the interior of the furnace normally being sealed so as to maintain any desired gaseous atmosphere therein as in case hardening.

Another feature of the present invention is to provide a novel furnace of the above character, having a novel, efficient quench mechanism for fast, positive quenching of the work load, the said quench mechanism having means for automatically submerging the work immediately upon the removal of the same from the muffle or heating chamber when desired, and serving to force quenching liquid uniformly throughout the work load by circulating liquid under pressure thereby obtaining a uniform product having optimum physical characteristics.

Still another feature of the present invention is to provide a novel furnace of the above character having a quench tank which serves to seal off the water-jacketed cooling chamber from below, automatically preventing the ingress of outside atmosphere to the controlled atmosphere of the cooling chamber and furnace, the work being automatically passed through the quench tank in sequence with the operation of the door between the cooling chamber and furnace wherein the load is chilled at the desired rate to the desired temperature, and thereafter automatically moved upwardly and out of the quench tank liquid, so that the work will drain and thereafter can be readily removed from the furnace after uniform quenching of just the desired duration.

A further feature of the present invention is to provide a novel furnace of the above character, that is equipped with controls for automatically effecting the cycle of operations thereof, all located in a convenient position for the operator, said controls including not only the operator's console, but an instrument panel having temperature recording instruments thereon.

These and other features of the present invention will be apparent from a perusal of the following specification taken in connection with the accompanying drawings wherein:

Fig. 2 is a plan view, with parts broken away, of the automatic loading mechanism of the furnace;

Fig. 3 is an elevational view, with parts broken away, of the structure shown in Fig. 2;

Fig. 8 is an enlarged fragmentary view, partly in section, showing the operation of the latching pawl of the loading mechanism, illustrated also in Figs. 4 and 5;

Fig. 9 is a plan view, partly in section, of the structure shown in Fig. 8;

Fig. 10 is an elevational, longitudinal, sectional view of the furnace heating chamber or muffle and associated parts, the said section being taken substantially along the line 10—10 of Fig. 11;

Fig. 11 is a part sectional view taken along the line 11—11 of Fig. 10;

Fig. 12 is a vertical, sectional view of a heating unit or member with parts broken away;

Fig. 13 is an enlarged, sectional view, taken along the line 13—13 of Fig. 12, with the heating unit casing omitted;

Fig. 14 is a perspective view of the structure shown in Fig. 13 with parts broken away;

Fig. 15 is a vertical, transverse, sectional view of the quench tank and quench chamber taken substantially along the line 15—15 of Fig. 1;

Fig. 16 is a sectional view taken along the line 16—16 of Fig. 15;

Fig. 17 is a perspective view, with parts broken away, of the water-jacketed cooling chamber;

Fig. 18 is a fragmentary side view of a portion of the structure shown in Fig. 17;

Fig. 19 is an enlarged, fragmentary view showing a portion of the quench tank and quenching mechanism shown in Figs. 15 and 16;

Fig. 20 is a fragmentary, sectional view taken along the line 20—20 of Fig. 19, and illustrates the material enclosed within the circle 20 of Fig. 16;

Fig. 21 is an enlarged sectional view taken along the line 21—21 of Fig. 16;

Fig. 22 is an enlarged, fragmentary view of a portion of the structure shown in Fig. 16, within the circle designated 22;

Fig. 23 is a fragmentary view of a chain tightener shown in dot-dash in Fig. 15;

Fig. 24 is a sectional view taken along the line 24—24 of Fig. 23;

Similar characters of reference are used in the above figures to designate corresponding parts.

Figure 1:
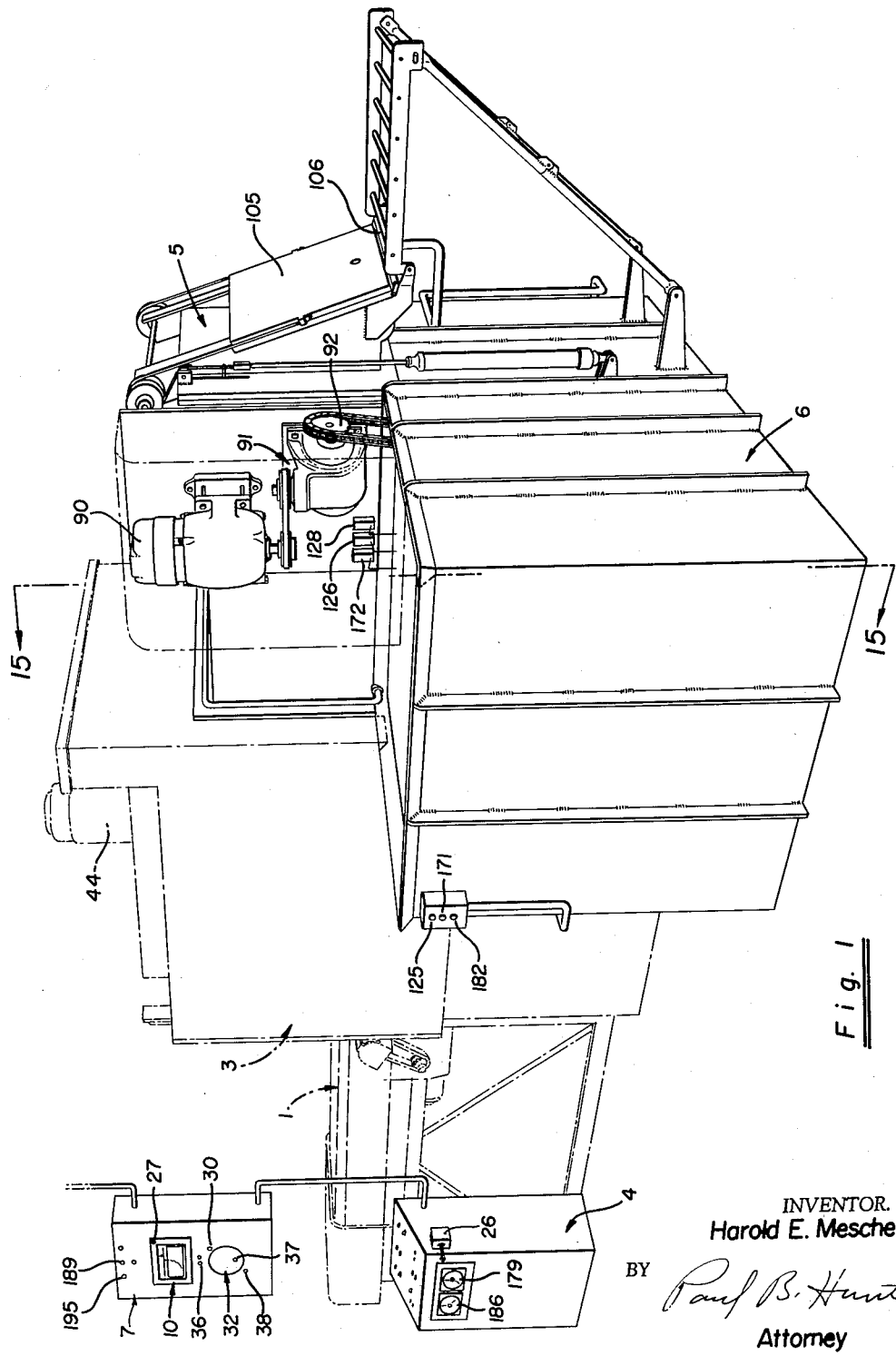
Fig. 1 is a perspective view of the novel heat-treating furnace of the present invention.

Referring now to the drawings initially for a brief description of the novel heat-treating furnace of the present invention, the same is controlled from a console 4 and comprises a loading mechanism 1 having an upper loading rack 2 comprising spaced rails upon which the load basket 9 containing the work to be heat treated is adapted to be placed, either by hand or by use of an overhead crane. The loading mechanism 1, through operation of push rods or forks 17, 17', serves to push the load 9 into the heating chamber or muffle of the furnace 3 and on to the rails 200 upon the opening of the charging door 24 thereof. After the load has been properly heated at the desired temperature for the pre-set time within the furnace muffle in the desired atmosphere, which may be supplied from an endothermic generator (not shown), the exit door 34 of the furnace muffle is adapted to open, and the load is moved automatically by the unloading push forks or rods 120, 120' into the water-jacketed cooling chamber 5 wherein the load may be atmosphere cooled and thereafter removed through unloading door 105, or, if desired, the load is submerged into the quench tank 6 with proper flow of cooling fluid thereover and therethrough, whereupon, after quenching, the load is automatically shifted to the top of the quench chamber 6 exteriorly of the furnace, ready for removal when desired. An instrument panel 7 is adapted to be conveniently located, preferably near the console 4, and is provided with a temperature controller and recorder 10, as will further appear.

It is necessary to have water, compressed air, natural gas, and furnace atmosphere gas such as ammonia, carrier gas and/or natural gas and propane, together with power, connected to the furnace. The furnace can be operated manually or automatically, although automatic operation is the usual and preferred way of using the furnace so as to eliminate human error and obtain a uniform product. Manual operation is generally used for maintenance and service purposes. The operator sets the desired minimum furnace or muffle operating temperature by adjusting the knob 27 of the potentiometer type indicating and recording temperature controller 10 (see Figs. 1 and 26). He then adjusts the knob 30 of the auxiliary connected temperature controlling instrument 32 to a temperature of approximately 50° above that for which knob 27 has been set. Thereafter, push button switch 36 is actuated to connect the instruments 10 and 32 to a source of power, illustrated in Fig. 26 as 115 volts.

Upon the excitation of instruments 10 and 32, the neon flasher 37 starts to flash and continues flashing until the operator presses re-set button 38, whereupon flasher 37 stops flashing thereby effecting the energization of relay 39 and the closing of this relay, which in turn energizes relay 40 to effect the closing of its contacts 41, thereby connecting the heating units or members 42 to the three-phase line 43.

The heating units 42 are shown as eighteen in number in the drawings (see especially Figs. 10 to 14 inclusive); they are arranged at both sides of the muffle, therewithin, suitably spaced apart, and are also arranged transversely at the bottom of the muffle. These heating units comprise a gas and oxidation resistant hollow casing 45, as of Inconel, which resists corrosion and oxidation by furnace atmosphere. These casings or tubes extend into the furnace through suitable apertures in the top and side walls thereof, as especially shown in Fig. 11, and can be easily removed and replaced when they become worn without a major shutdown. By spacing these tubes along the side walls and near the floor or bottom of the muffle, even, fast heat distribution to the entire load within the furnace is ensured, and a substantially uniform temperature obtains throughout the furnace. The heating units 42 may be gas-fired, but, in the drawings, they are shown as electrically heated by use of a series of circumferentially disposed U-shaped resistant rod elements 46 as of Nichrome. These elements are carried by a series of hat-shaped ceramic insulators 47 which are stacked up within the tubes 45, as especially shown in Fig. 12. The U-shaped rod elements have their legs extending through apertures provided near the periphery of the successive hats 47, as especially shown in Fig. 14, so that these hats serve to space the heating elements uniformly, while, at the same time, they enable the ready removal thereof, when desired.

With the furnace supplied with eighteen heating units, the distribution of these units with respect to the supply voltage is preferably such that six units are connected across each phase of the three-phase supply 43. Thus, if this supply is a 230-volt supply, three six-unit sets can be connected with each six units connected in series across one phase of the supply, as for example with the supply Y-connected, giving an effective voltage of approximately 133 volts across each phase, which, with the units arranged in series, will result in supplying approximately 22 volts to each heating unit. This voltage in turn, as especially shown in Figs. 13 and 14, is applied in series to six U-shaped elements 46 of each unit as across legs 48 and 48' of heating elements disposed substantially diametrically opposite each other within a heating unit. As will be noted from these figures, current will thus flow downwardly through leg 48, for example, and upwardly through the adjoining leg of one heating element, through the welded connection 49 at the top of the adjoining elements 46, and then progressively through each U-shaped element 46, until the current comes out of leg 50 whereat the current then is made to pass diametrically across the top hat 47 by use of a connector 51, thence down through leg 52, around the other three elements 46 of the heating unit, and out of leg 48'. In this way, the 22 volt supply for each heating unit is split up into twelve portions of somewhat less than 2 volts each existing between the legs of each U-shaped element 46, whereby, in the event that dirt or other material such as metal flaking off the element 46 in use should fall downwardly within the casing 45, it will not cause local short circuits and hot spots which might result should the voltage between successive rod legs be large, such as of the order of 22 volts, which would obtain if these various rod legs were connected in parallel. Also the brim parts of successive hats 47 serve to catch foreign material and prevent shorting the elements 46. In this way, the heating elements will have an exceedingly long life without breakdown.

The thermocouple 53 (Fig. 26) will respond to the temperature rise within the furnace due to the operation of the heating units 42, and the output of this thermocouple is supplied to the instruments 10 and 32 via lead 54, so that, when the muffle temperature has reached that for which the instrument 32 is set, namely 50° for example above the normal operating temperature determined by the setting of knob 27, instrument 32 will operate to open switch 38, thereby de-energizing relay 39 which, in turn, de-energizes relay 40, so that the heat elements are automatically disconnected from the power supply, and upon the manual operation of re-set button 38, where the temperature drops below the minimum setting required by the setting of knob 27, the instrument 10 will reactivate the heating elements to maintain the muffle temperature at that set by knob 27. Normally, instrument 10 controls the furnace temperature without regard to instrument 32 unless the temperature exceeds that set by control point of instrument 10.

The operator now actuates the console selector switch 31 (see Figs. 2 and 26) to any one of three positions marked A, C and M, on the console, A indicating an entirely automatic cycle, C indicating automatic operation up to the quench cycle, and M indicating manual control of the system which is particularly useful for testing and in case the automatic cycle fails to operate in an emergency. Thus, the operator sets the selector switch 31 to the type of operation he wishes, such as the manual position M, preparing the electrical control circuit for the selected operation.

Figure 26:
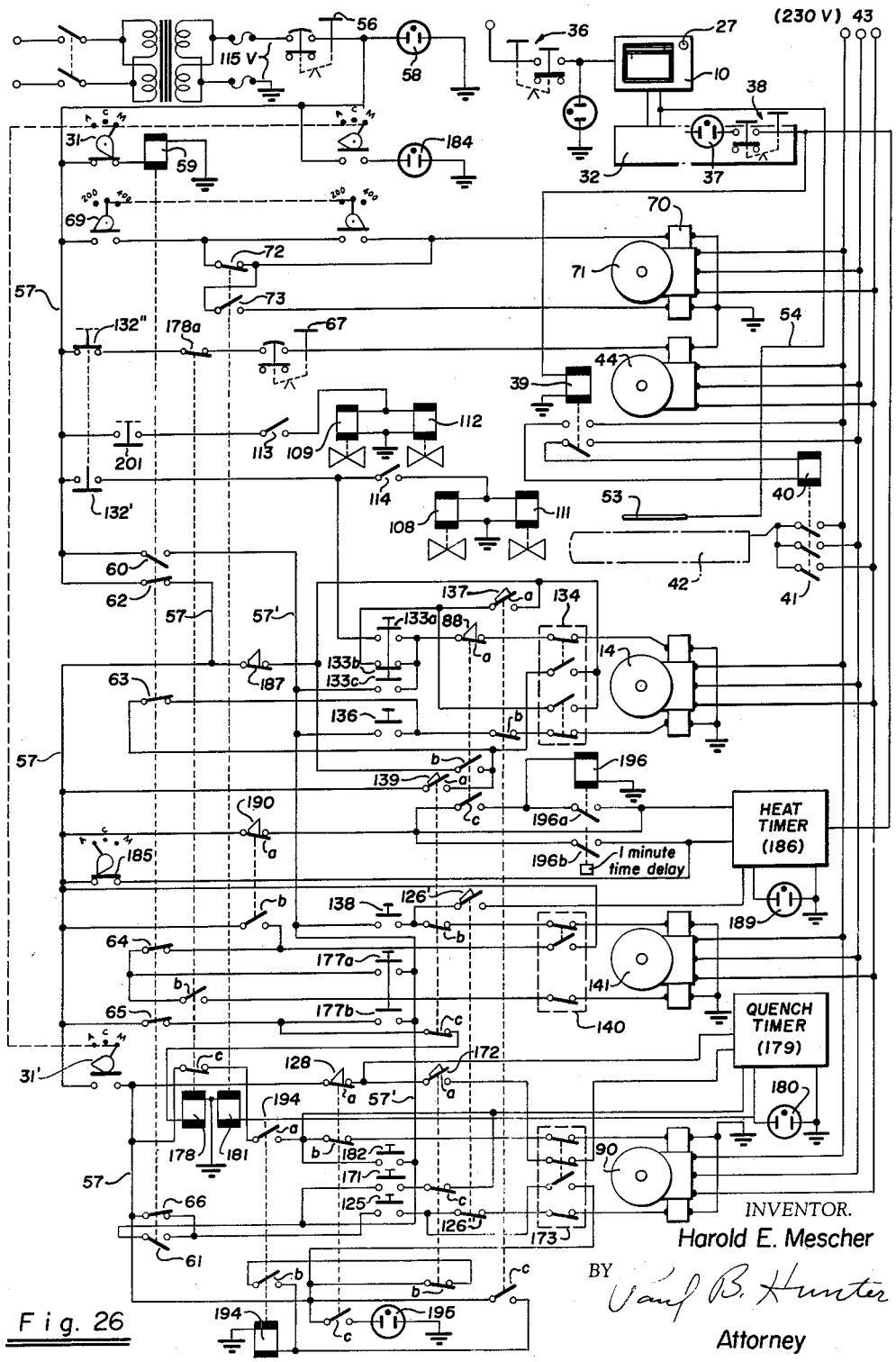
Fig. 26 is a wiring diagram of the control circuits used in operating the novel heat-treating furnace.

With switch 31 set on the end or manual position, as illustrated in Fig. 26, the start-stop switch 56 on the console is actuated to closed position, as also shown in Fig. 26, thereby supplying line current to lead 57. Console light 58 lights up and relay 59 is actuated through switch 31, thereby closing contacts 60 and 61 and opening contacts 62, 63, 64, 65, and 66. Manual switch 67 on the console is closed, thereby supplying current from lead 57 to the starter of fan motor 44 and affecting the starting of this motor, which is supplied from leads 43, and resulting in the operation of fan 68 to circulate heated air throughout the furnace muffle.

Oil circulating switch 69, located on the console 4, is next actuated. This switch has three positions: the off position being in the middle, 200 gallons per minute to the left, and 400 gallons per minute to the right. With this switch thrown either to the left or to the right, current will be supplied from lead 57 to motor starter 70 of oil circulating motor 71, thereby starting this motor and causing the same to operate at 200 gallons per minute at this time. It should be borne in mind that relay switch 72 is normally closed, and switch 73 is open, at this phase. Oil circulating motor 71, as especially shown in Fig. 10, drives centrifugal pump 74 to circulate oil through heat exchanger 75, through conduit 76, and into the hollow shaft 77 (Fig. 16) extending transversely within the quench tank 6 and supported in bearings 78 and 78' provided therein. The shaft 77 has two longitudinal rows of mutually spaced apertures 79 (see also Fig. 21) through which the circulating oil or quench liquid is adapted to flow at high velocity into the interior of the quench tank 6, as will further appear. Oil from tank 6 passes downwardly through apertures 80 (Fig. 19) in a sump 81 provided at the bottom of tank 6, and from thence this oil flows through a conduit 82 and pipe 83 back to pump 74.

The shaft 77 is provided with radially extending arms 84 and 84' which turnably support at their outer ends a transverse rod or shaft 85. This rod supports a rack or carriage 86 by means of brackets 87 fixed to the ends of the rack and to rod 85.

The rack or carriage 86 serves for carrying the work from the cooling chamber 5 through the quench tank 6 to a position exterior of the furnace, as illustrated in Fig. 15. In order to obtain the desired movement of the rack 86, a rack actuated motor 90 is provided, which, acting through a slip clutch and reduction gearing 91 and sprocket 92, serves to drive an actuating chain 93. This chain passes over idler sprockets 94 and 94', over tensioning sprockets 95 and 95', and around a fixed arcuate guide 96. The ends of this chain are connected at 97 through bracket 98 (see Fig. 20) to arm 84', so that, as motor 90 operates, the chain 93 serves to move arms 84 and 84' together with the carriage or rack 86 through any desired angular position. In order to keep the rack 86 horizontal at all times, a sprocket 89 is fixed to the side of tank 6, as through use of a hub 100. This sprocket carries a chain 101 which passes downwardly and around a sprocket 102 fixed to the shaft 85 and rack 86, so that, as carriage 86 moves within the tank 6, the chain 101, by turning sprocket 102, serves automatically to retain carriage 86 in a horizontal position, as is desired for supporting the load 9. The tensioning sprockets 95 and 95' are illustrated in Fig. 23 as carried by weighted arms 103, thereby retaining chain 93 taut at all times.

Figure 25:
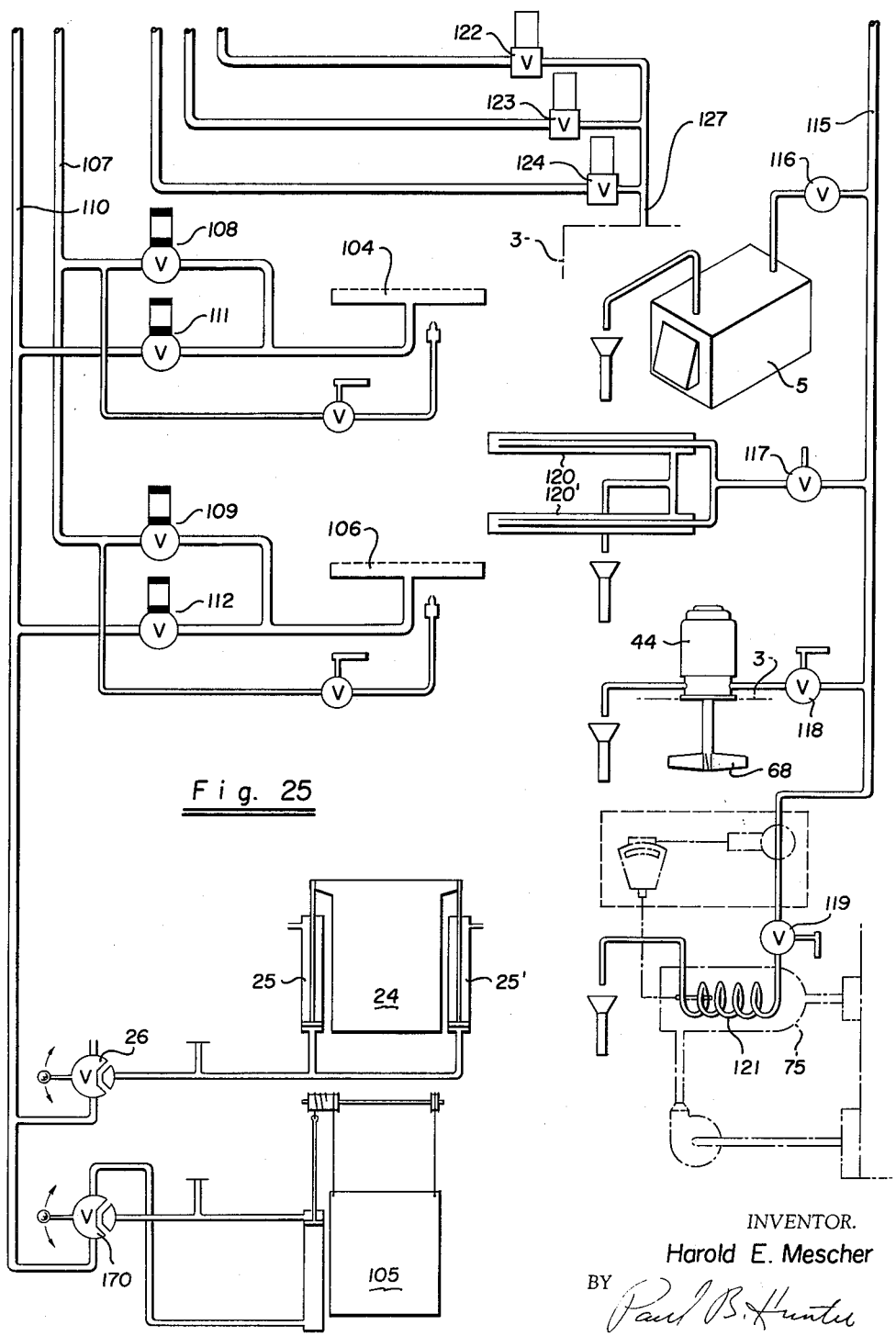
Fig. 25 is a schematic view of the fuel, atmosphere and cooling water supplies to the furnace.

The furnace entrance or loading door 24 is provided with a curtain burner 104 (see Figs. 10 and 25), and also the cooling chamber has an unloading door 105 provided with a curtain burner 106 (Figs. 18 and 25). These burners are provided with pilot burners which are supplied from a gas supply line 107 (see Fig. 25). Similarly, the flame curtain burners 104 and 106 are supplied from the gas line 107 through solenoid control valves 108 and 109. Air under pressure is supplied to burners 104 and 106 from pipe 110 through solenoid control valves 111 and 112. With the pilot burners lighted, switches 113 and 114, positioned on the corner of cooling chamber 5 (shown in Fig. 17), are closed manually, thereby preparing the solenoid valves 109, 112, 108, and 111, for operation. Cooling water is supplied through pipe 115 to valves 116, 117, 118, and 119, controlling the flow of this water respectively to the cooling chamber 5, the unloading forks or push rods 120 and 120', the bearings of the fan motor 44, and the cooling coil 121 of the quench oil heat exchanger 75.

When instruments 10 and 32 indicate that the furnace temperature has reached the desired value, for example, 1250°, the desired furnace atmosphere is supplied to the muffle through manually controlled valves 122, 123, 124, and pipe 127, connected in suitable gas lines such as an ammonia, a natural or propane gas line, and a carrier gas line. By properly adjusting these valves, the desired atmosphere can be fed into the muffle 3.

Before pushing the load into the furnace, the operator makes sure that the carriage 86 is positioned within the cooling chamber 5 for receiving the work when it is ejected from the muffle. To do this, he will be sure that switch 125 on the quench tank 6 is pressed in. With switch 125 closed, and assuming that the carriage 86 is in some other position than in the cooling chamber, then current will flow through switch 56, lead 57, lead 57', relay contact 60, relay contact 61, push button 125, limit switch blade 126'', and the motor starter 173 of carriage activating motor 90, to drive this motor and effect movement of the carriage 86 to the desired terminal position within the quench chamber 5, thereby causing arm 129 on hollow shaft 77 to strike rod 130 (see Figs. 16 and 21) to actuate limit switch 126 to open blade 126'', thereby stopping quench motor 90.

The furnace is now ready to receive the load basket 9 which has been placed previously upon the loading mechanism 1. Referring in detail to Figs. 2 through 9 of the drawings, the novel loading mechanism comprises a table frame member 8 having an upper vertically movable top portion 8' carrying the loading rack 2 (see especially Figs. 6 and 7) consisting of spaced apart rails carried by the frame portion 8'. The load basket 9 (shown in dot-dash lines in Figs. 2, 3, and 6) is adapted to be placed upon the rack 2 and is pushed into the furnace by means of the loading forks or push rods 17 and 17'. The fork rods 17, 17' are mounted above the rack 2 and are carried as by being welded to upstanding legs 18, 18' of a carriage 19 that is adapted to slide longitudinally along guide rails 20, 20' carried by the vertically movable upper table portion 8' of frame 8. The carriage 19 is moved by means of a transversely extending cross rod 11 that has its ends carried by sprocket chains 12 and 12', the rod 11 being adapted to engage depending lugs 13 and 13' provided on the carriage 19 during the forward movement of the carriage toward the furnace. The rod 11 moves along with the two chains 12 and 12' which are driven from a pusher rod driving motor 14. This motor acts through reduction gearing 15 and clutch 16 to actuate sprocket gearing 21 to drive the shaft 22 having sprockets 23 and 23' (see especially Fig. 7) fixed thereon for driving the chains 12 and 12'. With the oven temperature at the desired value as indicated by instrument 10, the operator will initially effect the opening of the furnace door 24 by turning the handle of control valve 26 shown mounted on the side of the console 4. Valve 26 controls the flow of compressed air from pipe 110 to cylinders 25, 25' (see Fig. 25) supported at their lower ends on the furnace 3 and having actuating pistons connected to the top of the door, thereby moving the same upwardly in the door guides. As the door 24 opens, the limit switch 132 on the front of the furnace is actuated, thereby closing its contact blade 132' and opening 132". The opening of 132" stops fan motor 44, and the closing of 132' serves to energize solenoid valves 108 and 111 to supply air and gas to the loading door flame curtain 104, thereby sealing off the muffle atmosphere from the outside air and preventing ignition thereof. Also, this prepares the circuit for controlling push button switch 133 mounted on the console 4. The push button switch 133 is then closed, so that current is supplied from lead 57 through switch blade 132', switch 133, blade 88a of maximum intravel limit switch 88 mounted on frame portion 8', through motor starter 134, to push rod drive motor 14, thereby causing this motor to be driven from supply lines 43 to move loading forks or push rods 17, 17' towards the right as viewed in Figs. 2 and 3, to move the load 9 into the furnace. Push rod drive motor 14 actuates sprocket chains 12 and 12' causing rod 11, by engaging lugs 13 and 13', to move carriage 19 forwardly towards the furnace, so that rods 17, 17' are caused to push the load basket 9 into the furnace onto the tracks 200. When the load has reached the proper position in the furnace, the pusher rod carriage lug 135 (Fig. 6) strikes the maximum intravel limit switch 88, causing blade 88a to open and blades 88b and 88c to close so that motor 14 ceases to operate.

The operator now presses push button 136 on the console 4, which, when held down, causes current to be supplied from lead 57 through switch blade 60, lead 57', switch 136, normally closed switch blade 137b, and motor starter 134, to drive fork motor 14 in the reverse direction which actuates cross rod 11 away from the furnace so that it strikes depending lugs 143 and 143' on carriage 19 (see Fig. 6) to move this carriage, and hence the forks 17 and 17', back rearwardly and away from the furnace. When the forks are in their fully retracted position, the operator releases push button 136.

Now the operator closes the loading door by actuating valve 26. As the door closes, it actuates limit switch 132 (Figs. 10 and 26) to close contacts 132", thereby restarting the fan motor 44, and also opening blade 132' to de-energize solenoid valves 108 and 111 cutting off the supply of air and gas to the loading door flame curtain 106, shutting off this curtain.

The work is allowed to remain within the muffle for the desired time at the desired temperature, whereupon push button 138 on the console 4 is closed, thereby supplying current from lead 57', push button 138, through normally closed contact 139b, through motor starter 140, to operate the intermediate door motor 141 in the proper direction to raise the intermediate door 34. As the motor 141 turns, it actuates gearing 142 (see Fig. 10), not only to raise the door but also to actuate the limit switch 139, so that, when the door is fully raised, this switch is actuated to open the contact 139b and stop the motor.

Figure 4:
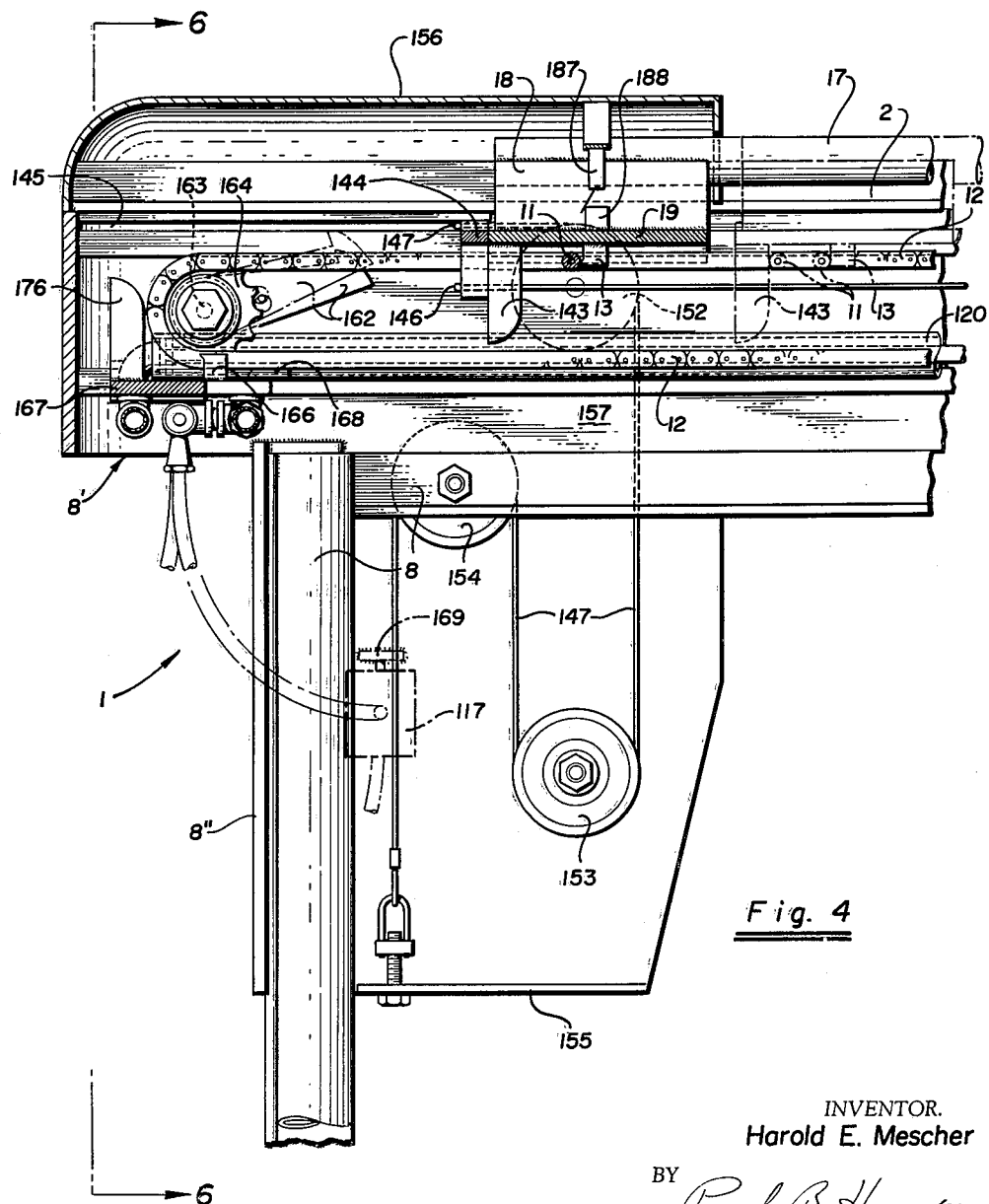
Figs. 4 and 5 are enlarged fragmentary, elevational views of a portion of the structure of Fig. 3, showing the operation of the loader.

Push button 136 on the console 4 is now held down, thereby supplying current from lead 57' through push button 136, through normally closed contact 137b and through the motor starter 134, to drive the carriage 19 further to the left as viewed in Fig. 4, i.e., away from the furnace. As the carriage 19 moves towards the left, it strikes an auxiliary carriage 144, the ends of which slide within slots 145 immediately below the loading rack 2 in side rails 157 and 157'. This auxiliary carriage has the ends of two pairs of cables 146 and 147 attached thereto. The cables 146 extend forwardly below the loading rack 2 and pass around pairs of sheaves 148, 149, and 150, and have their forward ends connected to a transverse platform 151 supporting motor 14 and carried by the upper vertically movable portion 8' of frame member 8. Similarly, cables 147 pass around pairs of sheaves 152, 153, and 154, and have their other ends connected to depending webs 155 of upper portion 8' which are rigidly connected at their upper ends to cowling 156 (Fig. 6) carrying side rails 157 and 157' which support the rear end of loading rack 2. The forward end of this loading rack is also supported by side rails 157 and 157' which, in turn, are secured to depending plates 158 and 158' carrying platform 151. In addition, a cowling 159 interconnects these members adjacent the furnace.

Figure 5:
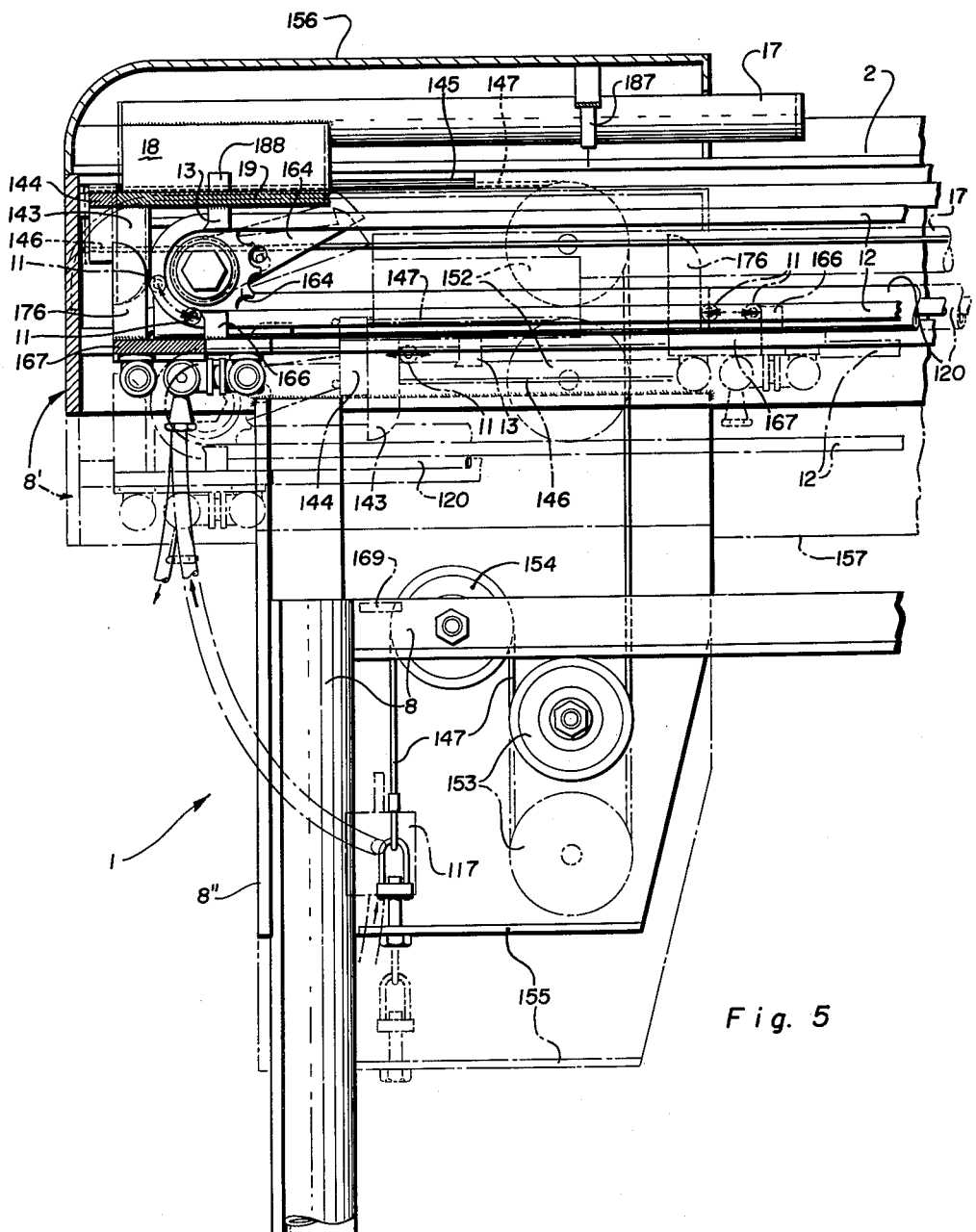
Figure 6:
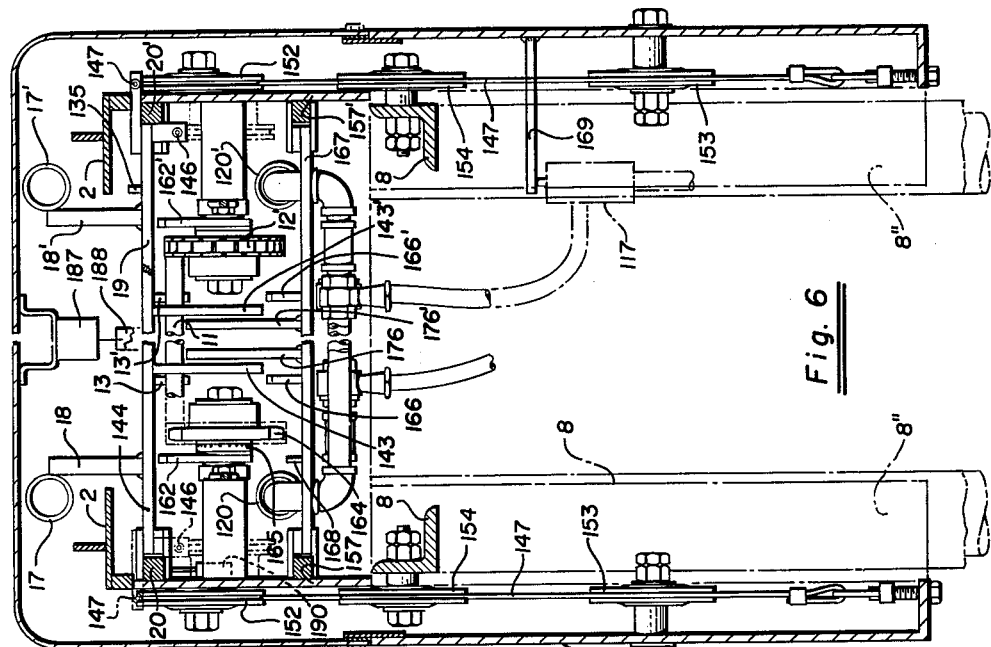
Fig. 6 is a sectional view taken along the lines 6—6 of Fig. 4.
Figure 7:
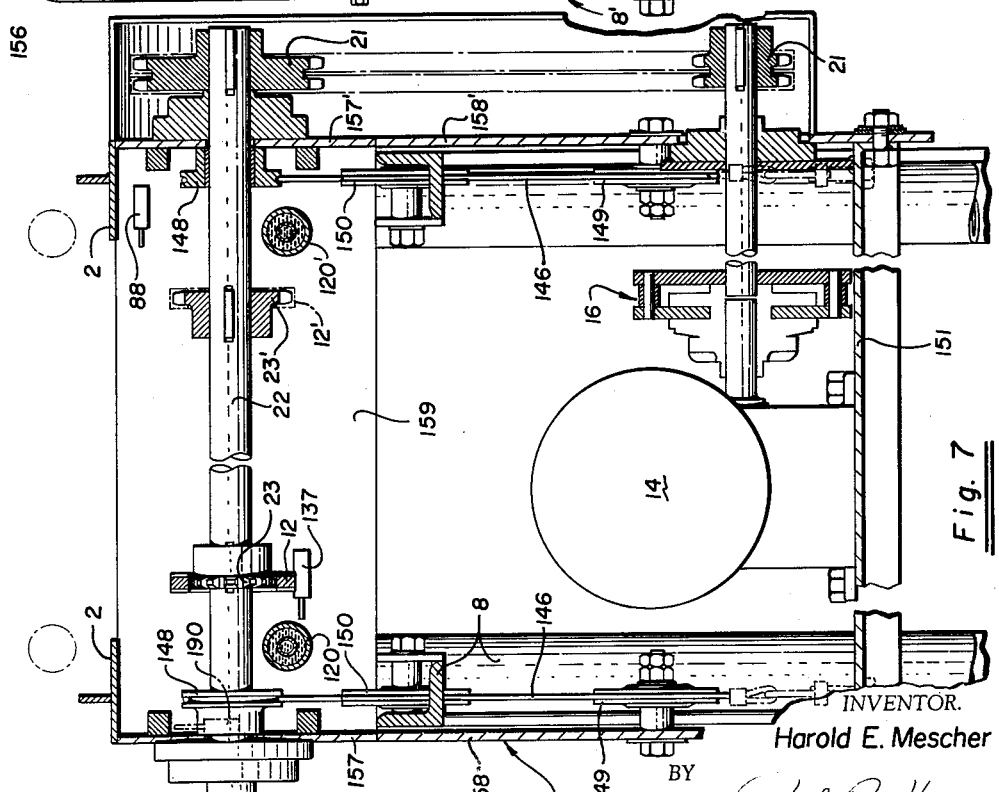
Fig. 7 is an enlarged, sectional view, taken along the line 7—7 of Fig. 3.

As the auxiliary carriage 144 moves towards the left, as viewed in Figs. 4 and 5, due to the motion of carriage 19, auxiliary carriage 144 pulls the ends of pairs of cables 146 and 147 towards the left, thereby raising the upper portion 8' of the table 8 upwardly. This will be apparent when it is noted that sheaves 150 and 154 have their supporting shafts fixed upon the stationary frame member 8, so that, as the cables 146 and 147 tighten, the platform 151 on the forward end of the table and the webs 155 at the rear end of the table are raised due to the connection of the shafts of sheaves 150 and 154 thereto respectively, together with the fact that the ends of the cables are connected to these members. Thus, as shown in Fig. 5, the upper portion of the table 8' is raised upwardly from the dotted-line to the full-line position, depending angle irons 8" on portion 8' being guided by frame member 8 during this movement, in which upper position the lower pair of unloading forks or push rods 120 and 120' have been raised so as to be in line with the load basket 9 within the furnace. During the upward motion of the carriage portion 8', a lug 169 (see Fig. 6) carried thereby operates water valve 117 to supply cooling water to the interior of the unloading forks 120 and 120' (see Fig. 25). As the upper portion 8' of the table moves upwardly, the ends of forks 120 and 120' adjacent the furnace strike the handles of closure plates 160 and 160', thereby raising these plates and exposing circular openings 161 and 161' in the furnace door 24.

Continued movement of the carriage 19 away from the muffle causes this carriage to engage and depress the bevelled ends of pawls 162 and 162' so that the carriage rides over these pawls which are pivotally mounted on shafts 163 and 163', which shafts also carry the sprockets 164 and 164' engaging drive chains 12 and 12'. Interposed between the sprockets 164 and 164' and the pawls 162 and 162' are rubber friction clutches 165 which tend to turn the pawls 162 and 162' counter-clockwise as viewed in Fig. 8 at this time due to the turning of sprockets 164 and 164' by the chains, so that, when carriage 19 moves past the end of the pawls, the same snap upwardly to retain this carriage against movement towards the right or toward the muffle as viewed in Fig. 5, thereby serving to hold the upper portion 8' of the table in its uppermost position so that the push rods 120 and 120' are now positioned for entering the furnace muffle through circular openings 161 and 161' to move the work through the muffle and into the cooling chamber 5, the intermediate door 34 being opened. Continued movement of the chains 12 and 12' causes transverse rod 11 to turn counter-clockwise around sprockets 164 and 164' and engage up-standing lugs 166 and 166' of lower carriage 167 carrying unloading forks or rods 120 and 120' (see Fig. 6), so that this carriage and the rods are moved forwardly into the furnace to engage the basket 9 and push the same through the open intermediate door and on to rack 86, whereupon lug 168 on carriage 167 strikes limit switch 137 on cowling 159, thereby opening switch blade 137b and closing switch blade 137a, thereby opening the circuit of fork motor 14 and stopping the forward movement of the unloading forks.

Push button switch 133 on the console is now closed, so that current is supplied from lead 57' through switch blade 133c, normally closed blade 88a of limit switch 88, to motor starter 134, to operate motor 14 in order to drive chains 12 and 12' clockwise and cause cross rod 11 to strike upwardly projecting lugs 176 and 176' on lower carriage 167 and move this carriage towards the left as viewed in the figures, thereby withdrawing the unloading forks from the furnace. When these forks are fully withdrawn from the furnace, the cross rod 11 strikes lug 143 and moves the same slightly towards the left as viewed in Fig. 5, thereby releasing pawls 162 and 162' from carriage 19, so that these pawls turn clockwise with the chains 12 and 12' out of contact with the carriage 19. Continued movement of the chains causes cross rod 11 to continue its movement upwardly and over the sprockets 164 and 164' and, since the weight of the upper portion 8' of the frame is acting through sheaves 149 and 153 to tension cables 146 and 147, these cables serve to cause auxiliary carriage 144 to follow the movement of the cross rod 11 and move with carriage 19 towards the right, at the same time effecting the lowering of the upper portion 8' of the frame member, ultimately to bring loading push rods 17 and 17' into their lower initial position preparatory to placing another load in the furnace. During the downward motion of the portion 8', the lug 169 strikes valve 117, shutting off the supply of cooling water to unloading forks 120 and 120'.

The intermediate door is now closed by pressing push button 177 on the console and holding down the same, thereby allowing current to flow from lead 57', through blade 177b and limit switch 139c to relay 178, thereby closing normally open contact 178b, allowing current to flow from lead 57', through blade 177a, blade 178b, to the motor starter 140 of interior door operating motor 141, thereby operating this motor to move the door to closed position. Thus, the hot gases of the furnace are kept from entering the cooling chamber 5. The work can be atmosphere cooled in this chamber, if desired, and the rate of cooling determined by controlling the flow of water around chamber 5 through operation of valve 116. The rear unloading door 105 can be opened by actuating unloading door valve 170 (see Figs. 17 and 25), whereupon the work can be removed manually through the open door. As the unloading door 105 opens, it closes limit switch 201, thereby starting the flame burner 106 to keep outside atmosphere out of the cooling chamber. The subsequent closing of this door automatically shuts off this burner by the opening of switch 201.

In case it is desired to liquid quench the work, the unloading door 105 remains closed and push button 171 (Figs. 1 and 26) mounted on the quench tank 6 is pressed in, thereby supplying current from lead 57' through this switch, closed blade 172c of limit switch 172, blade 128b of limit switch 128, to the motor starter 173 of quench motor 90, causing this motor to operate and move rack 86 from its terminal position within the cooling chamber 5 to the lower central portion of the quench tank, as shown in full lines in Fig. 15, in which position lug 174 on shaft 77 strikes bell crank lever 175 (see Fig. 21), thereby actuating limit switch 172 to open switch blade 172c and stopping the quench motor 90.

While rack 86 was in the bottom of cooling chamber 5, the oil or coolant within tank 6 was continuously being circulated at the rate of approximately 200 gallons per minute since switches 69 and 72 were closed, causing a rapid flow of oil beneath chamber 5, thereby preventing such oil from becoming unduly heated from the work (which would cause undesired vaporization of the same) and, at the same time, tending to co-operate with cooling water in the jacket of chamber 5 to cool the atmosphere chamber 5 so as to effect the desired cooling of the work should the same remain in this chamber. It should be borne in mind that the oil or coolant is circulated through oil heat exchanger 75 (see Fig. 25) which serves to retain the oil at the desired set quenching temperature.

As soon as carriage 86 reaches its lower central position, lug 174 on shaft 77 strikes bell crank lever 175 actuating the rod 192 of limit switch 172 to open blade 172c, thereby shutting off current to the quench motor 90 and stopping this motor and movement of carriage 86. Motor 71 acts at this time to force oil through pipe 77, through holes 79 therein, downwardly as shown by the arrows in Fig. 15 and through the work basket 9 in surrounding relation to the work therein, to obtain a rapid and uniform cooling of the work by this cooling fluid.

When the work has been cooled to the desired extent, the operator will press push button 182 on tank 6 which supplies current from lead 57', through push button 182, through contact 128b, to motor starter 173, to operate quench motor 90 to move rack 86 to its upper dot-dash left-hand position, as shown in Fig. 15, preparatory to removing the work from the rack. As rack 86 moves from its lower central position, lug 174 moves from under bell crank lever 175, thereby permitting limit switch 172 to actuate to close contact 172c thereof. As the carriage 86 reaches its upper left-hand position as shown in Fig. 15, fork 183 (Fig. 21) strikes the actuating rod 130 of limit switch 126 to actuate blade 126" to open position, stopping the quench motor 90. The work basket can now be removed from the rack 86 at the convenience of the operator, thereby completing the manual cycle of operation. It will be noted that the cooling chamber wall has a depending portion that is submerged in the cooling fluid of quench tank 6 so that chamber 5 is sealed against ingress of outside air, thereby preventing undesired oxidation of the work and possible explosions otherwise taking place within the cooling chamber.

Usually, it is desired to operate the furnace automatically, and, to do this, the switch 31 is moved to the automatic or A position, causing panel light 184 to light and de-energizing relay 59, causing contact 60 and 61 to open and contacts 62, 63, 64, 65, and 66, to close. Switch 69 is placed on the desired operation, i.e., at 200 or 400 gallons per minute. Heat timer switch 185 being set in automatic position energizes heat timer 186 as of the type made by Automatic Temperature Control Company. The fan motor 44 operates as in the manual operation. The loading door operates as in the manual position, i.e., in order to load the furnace, the door valve must be opened manually, at which time the operator may go back to the console and depress the loading fork "in" button 133. Current flows through lead 57 through switch blade 132', switch 133, blade 88a, to the fork motor 14 to start the inward movement of the loading forks 17 and 17' and effect the movement of the basket 9 towards the furnace door. When the work has been inserted into the furnace, the lug 135 on carriage 19 strikes limit switch 88 which opens blade 88a, stopping the supply of current to the fork motor 14 and stopping the forks 17 and 17', but, instantaneous with this action, limit switch blade 88b closes allowing current to pass from lead 57 through blade 62, limit switch 187, blade 88b, blade 63, blade 137b, to the motor starter 134 of fork motor 14 to reverse the operation of this motor which withdraws the loading forks to their normal retracted position, in which position the lug 188 on carriage 19 strikes and operates limit switch 187 to open position, thereby stopping motor 14.

The loading door is now closed by operation of valve 26, thereby shutting off the flame curtain for this door (as previously described in connection with the manual operation) and restarting the fan motor 44. With the loading door closed, the furnace begins to regain its lost heat, and when the temperature controller 10 indicates the furnace has reached its "pre-set temperature," determined by the setting of knob 27, the timing cycle through heat timer 186 commences and also the heat timer light 189 lights up. A time delay relay 196 is connected in series with blades 190a and 88c, so that, when these blades are both closed, relay 196 is energized and closes its contacts 196a and 196b after a suitable time delay to prevent premature operation of the heat timer contact to excite heat timer 186, thereby limiting the time that the work is kept within the furnace heating chamber or muffle during the heat cycle. When the cycle of 186 is complete, light 189 goes out and the intermediate door 34 starts to open provided the quench rack 86 is in the bottom portion of the cooling chamber 5, in which case blade 126' is closed. The current for operating the intermediate door motor 141 is supplied through switch 190a, through heat timer 186, through blade 126', through blade 139b, to motor starter 140, thereby operating intermediate door motor 141 until limit switch 139 opens its contact 139b, thereby stopping the intermediate door in open position. Simultaneous with the opening of blade 139b, blade 139a closes, allowing line voltage to energize fork motor 14 and to drive it in a direction to move the discharge forks 120 and 120' into the furnace for pushing the load from the muffle on to the rack 86 within the cooling chamber 5.

As the unloading forks reach the inward end of their travel, the lug 168 on carriage 167 strikes the arm of limit switch 137, thereby opening switch blade 137b and closing switch blade 137a, thereby opening the circuit of fork motor 14 and stopping the forward movement of the unloading forks. The closing of blade 137a allows current to flow through switch 62, switch 187, blade 137a, normally closed contact 133b, blade 88a, to the motor starter 134 which reverses the motor of the fork motor 14 to retract the unloading forks. As these forks commence to retract, the carriage 167 strikes the depending arm of limit switch 190, thereby closing contact 190b and opening contact 190a; this causes a current to be supplied from lead 57, through blade 190b, switch 64, blade 178b, to motor starter 140, to effect the operation of intermediate door motor 141 and to close the intermediate door 34. Blade 139c is closed when the intermediate door is open, so that relay 178 is energized and effects the closing of blade 178b and the opening of blade 178a. The opening of 178a turns off the fan motor 44, to prevent furnace heat from entering the cooling chamber while the intermediate door 34 is open.

As the intermediate door 34 closes, limit switch 139 is operated to effect the opening of contact 139c and the de-energization of relay 178, resulting in the opening of contact 178b and shutting off the intermediate door motor 141—stopping the door in closed position. As the unloading forks move towards their withdrawn positon, the cross bar 11 carried by the sprocket chains strikes the depending lugs 143 and 143' of upper carriage 19, moving these lugs and the carriage 19 away from the furnace slightly, so as to release pawls 162 and 162', whereupon the weight of the upper portion 8' of the frame pulls the carriage 19 forwardly toward the furnace, so that this carriage follows closely behind the cross bar 11 until lug 188 on carriage 19 strikes the arm of limit switch 187, thereby opening this switch and stopping the fork motor 14 with the unloading forks fully retracted and with the loading forks 17 and 17' again aligned with the load preparatory to receiving a new load on the rails 2.

When the unloading forks had reached their innermost position with the load on the rack 86, contact 137c of relay 137 was closed, thereby energizing relay 194 and closing contacts 194a and 194b, which allows current to flow from lead 57 through blade 178c, through blade 194a, blade 128b, to motor starter 173 of the quench motor 90, thereby starting this motor to move the rack 86 to the lower central position within the quench tank 6, in which position lug 174 actuates bell crank lever 175 to actuate rod 192 and effect the actuation of limit switch 172 to close contact 172a, activating quench timer 179 which activates light 180 and relay 181 to close contact blade 73 and open contact blade 72, switching quench motor 71 on to full 400 gallons per minute operation, if so selected. At the end of the timing cycle, determined by quench timer 179, motor 90 is energized through limit switch blade 128b so that this motor operates to move rack 86 to its upper and outer position shown in dot-dash lines in Fig. 15. As the rack 86 reaches this outer discharge position, fork 183 on shaft 77 actuates the rod 197 of the limit switch 128 to open blades 128a and 128b, stopping motor 90, and simultaneously closing blade 128c which effects the lighting of unload light 195 on the instrument panel, indicating to the operator that the load can be removed at any time.

When the selector switch 31 is moved to the C position, automatic operation of the furnace takes place until the quench cycle, and the quench cycle is then operated as if the selector switch were on the manual position.

Thus, it will be seen that the novel heat-treating furnace of the present invention provides for extreme ease of work handling and maximum production of treated work for the space requirement of the furnace, the said furnace providing for uniform temperature control and fast heating together with maximum quenching efficiency and a low danger factor.

Thus, to load the furnace it is only necessary for the operator to place the load in front of the loading door 24 on the loading rack 2, open the loading door of the furnace and push the "in" button on the control panel. By this method, he is able to load from six to six hundred pounds without any undue strain or danger from coming in contact with heating elements. Also, he is not required to be closer than six feet from the furnace proper, thus eliminating all danger of serious burns. No manual labor is required on the part of the operator, as the electric push button mechanism places the load at the proper position in the furnace. The furnace or muffle gives maximum heat transfer to the load with optimum uniformity, as provided by the use of spaced heating elements on each side of the load as well as under the load, together with the use of a high velocity recirculating fan installed within the muffle, so that good muffle atmosphere is circulated throughout the entire charge, obtaining the maximum rate of heat treatment.

The load itself moves on cast alloy rails, both within and without the furnace, and, since all handling of the load is done by external means, extremely low maintenance costs are possible as the moving parts are not subjected to high temperatures. The water-jacketed cooling chamber 5 is held to minimum size to afford good heat transfer from the load to the cooling medium, and also providing a low danger factor from the cold atmosphere explosion standpoint since atmospheric air does not get access to inflammable furnace atmosphere present in this cooling chamber; furthermore, the cooling chamber is sealed against atmosphere air by the depending wall portion 193. The rear or unloading door 105 of the cooling chamber is of the flapper type, and, should an explosion occur in spite of all the precautions taken in the construction of the cooling chamber, this type of door easily releases internal pressures and again provides maximum safety. Since on automatic operation the heating and unloading cycles of the furnace are controlled by automatic timing, once the load is in the furnace the operator has essentially no other function than removing the quenched load from the quench rack, and thus great ease of operation is provided. Quenching is accomplished by means of the electric motor 90 operated in sequence with the intermediate door 34. This method of quenching provides positive quench cycles and a desired short speed, as of seven seconds, regardless of load weight or size. During the quenching cycle, the load is automatically removed from the water-jacketed cooling chamber 5 to the center portion of the quench tank 6 where oil is fed from a high velocity, high volume, recirculating pump 74 through the load from top to bottom. This pump being of two-speed design, it can give either a 200 or 400 gallons per minute circulation, depending on the nature and required quenching speed of the load. At the end of the quenching, the load is automatically brought to the outside air immediately above the oil tank where it drains automatically, thus assuring the minimum amount of oil loss due to quench and also affording the maximum safety protection to the operator, as a door opening is not required in removing the quenched load.

Since many changes could be made in the above construction of the novel heat-treating furnace of this invention and many apparently widely different embodiments of this invention could be made without departing from the scope thereof, it is intended that all matter contained in the description or shown in the accompanying drawings shall be interpreted as illustrative and not in a limiting sense.

What is claimed is:

1. A heat-treating furnace comprising a furnace heating chamber having entrance and exit doors at opposite ends thereof and slide rails therewith over which work may be passed from the entrance door through the heating chamber and out through the exit door, a loading rack in front of said furnace entrance door provided with two pairs of vertically and horizontally movable push rods for engaging work placed upon said loading rack, one pair of push rods serving to push the work along said loading rack automatically into the furnace upon the opening of said entrance door and the other pair of push rods serving to push the work out of the furnace through said exit door after a heat-treating operation, a cooling chamber adjoining the exit door of said heating chamber, said second pair of push rods serving to move the heat-treated load from said heating chamber past said exit door and into said cooling chamber, motive means for moving said pairs of push rods vertically and horizontally to effect the desired movement of the load through the furnace, said cooling chamber having an unloading door for enabling the removal of the work load therefrom, and flame curtain protective means at said furnace entrance and at said cooling chamber unloading door for preventing cold atmosphere detonation of controlled atmosphere gases within the furnace and cooling chambers.

2. A heat-treating furnace as defined in claim 1 wherein a quench tank containing cooling fluid is provided beneath said cooling chamber, the cooling fluid within said quench tank serving to seal said cooling chamber against outside atmosphere, and motor driven means within said quench tank for moving the work load from said cooling chamber downwardly into the quench tank and for forcing fluid through the work load transversely to effect the rapid cooling of the same and thereafter to move the quenched load upwardly and outwardly of the quench tank to an unloading area removed from said cooling chamber to allow the load to drain preparatory to removal of the work load from the furnace.

3. A heat-treating furnace as defined in claim 1 wherein said loading rack is provided with a carriage carrying said first pair of push rods, motor driven sprocket chain means for moving said carriage and said first pair of push rods to effect movement of the load into the furnace heating chamber, said motor driven sprocket chain means being reversible to effect the removal of the first pair of push rods from the furnace upon the placing of the load therein, and control circuit means for controlling the operation of said carriage.

4. A heat-treating furnace as defined in claim 3 wherein said second pair of push rods are positioned below said first pair of push rods, a carriage carrying said second pair of push rods, means for raising said carriage to position said second pair of push rods in elevational alignment with the load within the heating chamber, said motor driven sprocket chain means serving to move said second pair of push rods into the furnace heating chamber and effect the pushing of the load therefrom and into the cooling chamber, said motor driven sprocket chain means serving to remove the second pair of push rods from the furnace after placing the load within the cooling chamber.

5. A heat-treating furnace comprising a furnace muffle chamber having entrance and exit doors, a loading rack positioned in advance of the chamber entrance door, mechanism connected with said rack for moving the work load placed thereon, a cooling chamber adjoining the exit door of said muffle chamber, a quench tank adjoining and positioned below said cooling chamber, quench tank mechanism within said tank for moving the load thereinto and quenching the same, a control circuit for automatically operating said load moving mechanism for moving a work load placed upon said loading rack into said furnace muffle chamber upon the opening of the furnace entrance door, the said load remaining therein for a time determined by the temperature at which the furnace muffle chamber is set and the desired treatment period of the load, and means controlled by said control circuit for automatically opening the exit door of the furnace chamber and for causing the load moving mechanism to move the load from the muffle chamber into the cooling chamber to be cooled therein, or, if desired, initiating said quench tank mechanism for submerging the load within the quench tank while circulating cooling fluid therethrough to effect rapid quenching of the load, whereupon said quench tank mechanism through operation of said control circuit automatically operates to eject the load at the upper part of the quench tank preparatory to removal of the same from the furnace.

6. In a heat-treating furnace, a muffle having entrance and exit doors and work slide rails therewithin, a loading rack, fork means carried by said rack and being movable therealong for automatically pushing work from said loading rack into said furnace muffle and on to said slide rails upon the opening of the furnace entrance door, a cooling chamber adjoining the exit door of said muffle, motive means for driving said fork means to push the work through said furnace muffle after a heat-treating operation is completed and upon the opening of said muffle exit door into said cooling chamber to be cooled therein, a quench tank beneath said cooling chamber adapted to contain quenching liquid, motive and connected heat exchanger means for cooling and circulating quenching liquid within said quench tank to aid in cooling said work within said cooling chamber and preventing excessive evaporation of the quenching liquid therewithin, and actuating motor means and connected work supporting means for immersing the work into said quench tank and for removing the same therefrom into the outside air.

7. In a heat-treating furnace as defined in claim 6, wherein said work supporting means comprises a carriage movable within said quench tank and into the bottom of said cooling chamber for receiving work moved thereinto from said muffle, said actuating motor means serving for moving said carriage on a circular arc downwardly into the quenching liquid for quenching the work, said quenching liquid cooling and circulating motive means serving to force quenching liquid downwardly and through the work submerged within said quench tank, and said actuating motor means serving to move said carriage along said circular arc carrying the work directly to the outer atmosphere at an unloading area exteriorly of said cooling chamber and at the top of said quench tank after quenching thereof.

8. Heat treating quenching apparatus as defined in claim 6, wherein said quench tank is provided with a pipe for conducting quenching liquid into said quench tank, and a work carrying carriage pivotally suspended from said pipe and movable within said tank along a circular path, said pipe being turnable with movement of said carriage within said tank and having apertures for directing quenching liquid in the direction of said carriage, whereby work carried by said carriage is rapidly quenched during its movements through said tank.

9. Heat treating quenching apparatus as defined in claim 8 wherein transmission means is provided interconnecting said pipe and said carriage for retaining the same horizontally disposed for holding the work upright regardless of the movement of the carriage within said tank along its circular path.

10. A heat-treating furnace comprising a muffle having entrance and exit doors at its opposite ends, motor driven loading mechanism comprising a pair of push rods for moving a work load into said muffle upon the opening of its entrance door, heating units for heating said muffle, a temperature controller for controlling the operation of said heating units and hence the temperature within said muffle whereby the work therewithin is heated to a desired temperature for a desired period in a desired atmosphere to effect the heat-treating thereof, motor means for opening the exit door of said furnace upon the completion of the heat-treating cycle of the work therein, said motor driven loading mechanism having a second pair of push rods serving to eject the work from the muffle through said exit door, a quench tank, and a motor driven quenching mechanism for receiving the work from said furnace muffle and moving the same along a circular arc to effect the quenching of the same in said quench tank and removal therefrom upon the completion of the quench operation, and a control circuit interconnecting the motor driven loading mechanism, the temperature controller of the muffle, the motor means for operating the exit door, and the motor driven quenching mechanism, for controlling the proper sequential operation of these furnace components.

11. A heat-treating furnace as defined in claim 10 having fan means under the control of said control circuit for circulating atmosphere within said muffle, and a heat timer acting in conjunction with said heat controller for controlling the heating of the work.

12. A heat-treating furnace as defined in claim 10 wherein motor means is provided under the control of said control circuit for forcing quench liquid through the work load when the latter is in said quench tank.

References Cited in the file of this patent

UNITED STATES PATENTS

| | | |
|---|---|---|
| 777,728 | Haskins | Dec. 20, 1904 |
| 1,630,784 | Coe | May 31, 1927 |
| 1,732,916 | Summey | Oct. 22, 1929 |
| 1,732,917 | Summey | Oct. 22, 1929 |
| 1,755,072 | Otis | Apr. 15, 1930 |
| 1,837,178 | Benner et al. | Dec. 15, 1931 |
| 1,842,972 | Ipsen et al. | Jan. 26, 1932 |
| 1,895,300 | Tytus | Jan. 24, 1933 |
| 1,951,092 | Jenks | Mar. 13, 1934 |
| 2,074,185 | Langhammer et al. | Mar. 16, 1937 |
| 2,341,766 | Fox | Feb. 15, 1944 |
| 2,647,978 | Dyer | Aug. 4, 1953 |
| 2,681,971 | Strickland et al. | June 22, 1954 |
| 2,776,134 | Wingate | Jan. 1, 1957 |
| 2,777,683 | Ferguson | Jan. 15, 1957 |
| 2,777,684 | Ferguson | Jan. 15, 1957 |
| 2,898,101 | Hannum et al. | Aug. 4, 1959 |